United States Patent [19]

Weiss et al.

[11] Patent Number: 4,720,963

[45] Date of Patent: Jan. 26, 1988

[54] METHOD OF DETECTING STONES IN THE INTAKE OF A FIELD CHOPPER

[75] Inventors: Burkhard Weiss, Weigsdorf-Köblitz; Arthur Hauschild, Sebnitz; Erich Herrmann, Polenz, all of German Democratic Rep.

[73] Assignee: Veb Kombinat Fortschritt-Landmaschinen, Neustadt/Sachsen, German Democratic Rep.

[21] Appl. No.: 914,634

[22] Filed: Oct. 2, 1986

[30] Foreign Application Priority Data

Oct. 4, 1985 [DD] German Democratic Rep. ... 281453

[51] Int. Cl.$^4$ .................. A01D 75/18; A01F 29/16
[52] U.S. Cl. ........................ 56/10.2; 56/DIG. 15
[58] Field of Search .................. 56/10.2, DIG. 15

[56] References Cited

U.S. PATENT DOCUMENTS

| | | | |
|---|---|---|---|
| 3,889,249 | 6/1975 | Bennett, Jr. | 56/10.2 |
| 3,896,608 | 7/1975 | Garrott | 56/10.2 |
| 3,959,953 | 6/1976 | Garrott | 56/10.2 |
| 4,290,255 | 9/1981 | Martenas | 56/10.2 |
| 4,322,937 | 4/1982 | Hollmann | 56/10.2 |
| 4,433,528 | 2/1984 | Bohman | 56/10.2 |
| 4,573,849 | 3/1986 | Johnson et al. | 56/10.2 |
| 4,639,666 | 1/1987 | Strosser et al. | 56/10.2 |

FOREIGN PATENT DOCUMENTS 3341071 5/1984 Fed. Rep. of Germany ....... 56/10.2

*Primary Examiner*—Paul J. Hirsch
*Attorney, Agent, or Firm*—Karl F. Ross; Herbert Dubno

[57] ABSTRACT

A hard foreign body in a stream of cut crop being moved by a conveyor in an agricultural machine to a crop comminuter of the machine is detected by first compressing the stream of cut crop transversely of its displacement direction between a pair of feed elements one of which is movable toward and away from the other and generating an actual-value output corresponding to the acceleration of the movable element toward and away from the other element. This output is compared with a set point corresponding to an acceleration level not normally exceeded by the element when the crop stream contains no hard foreign objects. An error signal is generated when the actual-value output exceeds the set point. When the error signal is issued advance of the conveyor is stopped and/or a warning is issued. The actual-value output is only generated when the acceleration of the movable feed element exceeds a predetermined limit. The actual-value output is a voltage and the set point is also a voltage.

5 Claims, 1 Drawing Figure

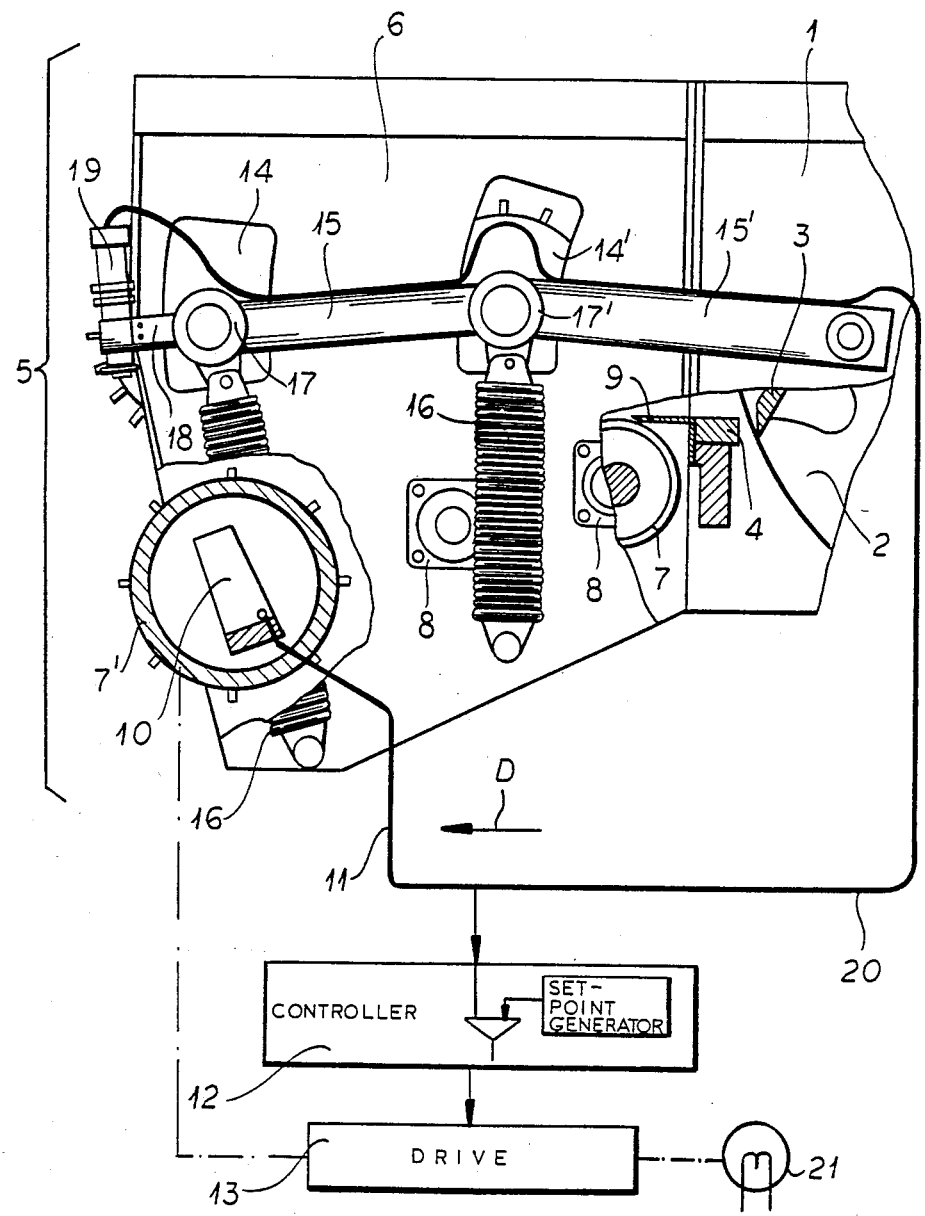

METHOD OF DETECTING STONES IN THE INTAKE OF A FIELD CHOPPER

CROSS REFERENCE TO RELATED APPLICATION

This application is related to jointly filed U.S. application Ser. No. 914,633.

FIELD OF THE INVENTION

The present invention relates to a method for detecting hard foreign bodies in the intake of an agricultural machine like a mower or field chopper. More particularly this invention concerns the detection of stones in this intake.

BACKGROUND OF THE INVENTION

A field chopper, mower, threshing machine, or the like normally has a frame that moves along the ground and that has a front end provided with a device for cutting the crop—corn, alfalfa, grass—at the base. An intake conveyor receives the crop from the cutter and compacts it into a stream which it transports back from the front-end cutter to a blade-carrying drum comminuter which rotates to chop the cut crop. This comminuter or chopper can be seriously damaged if a hard object like a stone, a piece of fencing, or the like is fed by the intake conveyor to it. However, since such a machine is normally being moved through a standing crop that effectively obscures what is directly in front of it, it is very difficult for the operator of the apparatus to see what is being cut and taken in. Thus recourse must be had to automatic detectors.

The detection of magnetizable or magnetically attractable objects is a relatively simple task. It can be done as described in U.S. Pat. No. 3,757,501, German patent No. 2,552,805 (filed by W. Garott with a claim to a priority of Dec. 04, 1974 of U.S. patent application No. 529,305), and East German patent No. 111,534 issued Feb. 20, 1975 to K. Wehsely by making the incoming crop stream pass through a magnetic field. When a potentially dangerous magnetizable object is detected an alarm is issued and/or the intake device and/or comminuter are stopped so that the object can be removed from the machine. The main disadvantage of such a system is that stones or similar solid objects do not have magnetic properties to make them detectable by such equipment. Objects like stones, blocks of wood, bones, or aluminum fencing can do as much harm as magnetizable objects and are just as likely to be encountered when harvesting. In addition when a piece of steel fence wire or the like is in the incoming crop stream it can get wound into the crop stream so is not easily detected by the field, particularly when generated by a plurality of independent coils as in above-cited East German patent No. 111,534.

Another system is described in East German patent Nos. 117,030 and 120,782 both of K. Wehsely. In these arrangements a pusher roller presses the stream of crop down against the conveyor and has at least two relatively displaceable portions. Since the crop is typically fairly soft, at least compared to the hard objects that should be detected by the device, the backwardly flowing cut-crop stream will be crushed and the two portions of the pusher-down roller will not move appreciably relative to each other. When, however, a stone or the like is pinched between one of the roller portions and the conveyor, this portion will be shifted relative to the other portion, typically by pivoting about an eccentric but parallel axis. Position-sensing mechanism will detect this relative movement and generate an error signal that will cause the controller to issue a warning and/or stop the machine. Such an arrangement does not work when the object being sensed strikes several portions, as it is relative movement of adjacent portions that is sensed. Furthermore an object imbedded in the crop will frequently also be missed as in most of the prior-art systems.

A further system is described in West German patent No. 3,213,713 (filed by W. Raeck with a claim to a priority of Apr. 15, 1981 of U.S. patent application No. 254,319) where the pusher roller is hollow and is provided internally with transducers which detect the characteristic ping made when a stone or similar hard object strikes this metallic pusher roller. For this system to work this pusher roller must be mounted so that it is insulated from the normal considerable vibration and noise produced during operation of the harvester. In addition the electrical signals produced by the crystal microphones used as transducers must be transmitted through trouble-prone commutator rings to the controller so that these signals can be analyzed and the machine shut down when a hard object is heard striking the pusher roller. Not only is such a device quite complex and, hence, expensive, but it also does not respond when a sufficient layer of soft material comes between the pusher roller and the conveyor, as this masks the sound made by the hard object.

OBJECTS OF THE INVENTION

It is therefore an object of the present invention to provide an improved method of detecting hard objects in the intake of an agricultural machine.

Another object is the provision of such a method which is simple, yet which surely and accurately detects hard objects, whether magnetically detectable or not, even when they are imbedded in a rapidly moving stream of cut crop.

SUMMARY OF THE INVENTION

A hard foreign body in a stream of cut crop being moved by a conveyor in an agricultural machine to a crop comminuter of the machine is detected by first compressing the stream of cut crop transversely of its displacement direction between a pair of feed elements one of which is movable toward and away from the other and generating an actual-value output corresponding to the acceleration of the movable element toward and away from the other element. This output is compared with a set point corresponding to an acceleration level not normally exceeded by the element when the crop stream contains no hard foreign objects. An error signal is generated when the actual-value output exceeds the set point. When the error signal is issued advance of the conveyor is stopped and/or a warning is issued.

According to the invention the actual-value output is only generated when the acceleration of the movable feed element exceeds a predetermined limit. In addition the actual-value output is a voltage and the set point is also a voltage.

Thus during the normal course of events the displaceable pusher element moves toward and away from the fixed but rotatable element as the passing stream of cut crop grows thicker and thinner. This variation does not however produce enough acceleration to pass the threshold as the incoming crop stream is crudely regular. When, however, a hard object like a stone comes between the two feed elements, even if it contacts neither of them directly, this suddenly appearing lump in the crop stream will cause the pusher feed element to move suddenly away from the fixed feed element, and the accelerometer will generate an output exceeding the limit so that this object is detected. Furthermore the accelerometer will respond again when, as is standard, the displaceable element is pressed toward the fixed element, the accelerometer moves rapidly in behind a lump formed in the stream by a hard foreign object. Thus each such stone will be detected coming and going as it passes the displaceable feed element, so that the chances that it be missed will be halved.

An accelerometer is a standard industry item that is, for instance, constituted by a magnetic object suspended between two springs compressible in the direction acceleration is to be sensed in and surrounded by a coil. As the body moves in the coil with compression of one spring and extension of the other it will generate a voltage in the coil which is directly proportional to its speed. The actual position will be irrelevant and slow changes in position will be represented by low voltages and high-speed changes by higher voltages.

DESCRIPTION OF THE DRAWING

The above and other features and advantages will become more readily apparent from the following, reference being made to the accompanying drawing whose sole FIGURE is a largely schematic view of a detail of a field chopper equipped with an apparatus for carrying out the method of the present invention.

SPECIFIC DESCRIPTION

As seen in the drawing a field chopper has a frame 1 adapted to travel along the ground in a horizontal travel direction D and carrying a main chopping drum 2 having blades 3 that are orbited about a horizontal axis fixed on the frame 1 and extending perpendicular to the direction D past a stationary anvil blade 8. A not illustrated cutter on the front end 6 of the frame 1 delivers cut crop to an upstream or forward large-diameter conveyor roller 7' followed by two smaller conveyor rollers 7 (only one shown in part) supported on the frame 1 on bearings 8 for rotation about respective horizontal and parallel axes also extending perpendicular to the direction D. A drive 13 operated by a controller 12 rotates all of the rollers 7 and 7'. This drive 13 can be formed by a transmission and clutch connected in series between the rollers 7 and 7' on the one side and the engine of the machine on the other.

Two rollers 14 and 14' are carried on bearings 17 and 17' on arms 15 and 15' for free rotation about axes above and parallel to those of the rollers 7' and 7. The arms 15' both extend in the direction D and have rear ends pivoted on the frame 1 about a horizontal axis perpendicular to the direction D and front ends pivotally carrying the rear pusher roller 14' which is formed, like the rollers 7, 7', and 14 of a cylindrical drum with radial spikes or ridges. The arms 15 in turn extend from the front ends of the arms 15' to the bearings 17. Respective springs 16 and 16' push the rollers 14 and 14' downward, toward the rollers 7' and 7 so as to compact and compress the stream of crop moving back opposite to the direction D to an intake plate 9 of the cutter drum 2.

An accelerometer 19 is connected between an extension 18 at the front outer end of the arms 17 and a stationary part of the frame 1 and is connected via a wire 20 to the controller 12. This accelerometer 19 generates a voltage output proportional to the acceleration of the rollers 14 and 14' toward and away from the rollers 7' and 7. This actual-value signal is matched in the controller 12 with a signal from a set-point generator and, when the actual value exceeds the set point, a signal is issued to the drive 13 to stop the rollers 7' and 7 and to a warning lamp 21 to stop the conveyor and warn the operator of the piece of equipment.

According to the invention during the normal operation of the device the rollers 14 compress the stream of cut crop coming back from the cutter and move up and down as this crop stream gets thicker and thinner, as it inevitably does in a fairly random manner. When, however, a hard object such as a stone or a block of wood gets into the stream, the rollers 14 and 14' are suddenly pushed upward and then drop suddenly back down, accelerating rapidly for both movements. Such sudden acceleration only occurs when a fairly solid lump is present in the crop stream, as the crop itself is fairly soft and is generally uniform. Thus this system detects the presence of a hard foreign body with great accuracy.

In addition the frontmost conveyor roller 7' is provided internally with an electromagnetic detector 10 connected like the accelerometer 19 via a line 11 to the controller 12. When an iron or other magnetically detectible object is sensed by the detector 10 the warning is issued and the drive 13 is stopped, the same as if a rock is detected by the accelerometer.

We claim:

1. A method of detecting a hard foreign body in a stream of cut crop being moved by a conveyor in an agricultural machine to a crop comminuter of the machine, the method comprising the steps of:
    compressing the stream of cut crop transversely of its displacement direction between a pair of feed elements one of which is movable toward and away from the other;
    generating an actual-value output corresponding to the acceleration of the movable element toward and away from the other element;
    comparing the output with a set point corresponding to an acceleration level not normally exceeded by the element when the crop stream contains no hard foreign objects and generating an error signal when the actual-value output exceeds the set point; and
    stopping advance of the conveyor on generation of the error signal.

2. The method defined in claim 1 wherein the actual-value output is only generated when the acceleration of the movable feed element exceeds a predetermined limit.

3. The method defined in claim 1 wherein the actual-value output is a voltage and the set point is also a voltage.

4. The method defined in claim 1, further comprising the steps of
    electromagnetically sensing the presence of magnetically attractable objects in the crop stream; and
    stopping the conveyor when such presence is detected.

5. A method of detecting a hard foreign body in a stream of cut crop being moved by a conveyor in an agricultural machine to a crop comminuter of the machine, the method comprising the steps of:

compressing the stream of cut crop transversely of its displacement direction between a pair of feed elements one of which is movable toward and away from the other;

generating an actual-value output corresponding to the acceleration of the movable element toward and away from the other element;

comparing the output with a set point corresponding to an acceleration level not normally exceeded by the element when the crop stream contains no hard foreign objects and generating an error signal when the actual-value output exceeds the set point; and issuing an alarm on generation of the error signal.

* * * * *